US008671220B1

(12) United States Patent
Garg et al.

(10) Patent No.: US 8,671,220 B1
(45) Date of Patent: Mar. 11, 2014

(54) NETWORK-ON-CHIP SYSTEM, METHOD, AND COMPUTER PROGRAM PRODUCT FOR TRANSMITTING MESSAGES UTILIZING A CENTRALIZED ON-CHIP SHARED MEMORY SWITCH

(75) Inventors: Gaurav Garg, San Jose, CA (US); David T. Hass, Santa Clara, CA (US); Kaushik Kuila, San Jose, CA (US); Gaurav Singh, Santa Clara, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 125 days.

(21) Appl. No.: 12/325,050

(22) Filed: Nov. 28, 2008

(51) Int. Cl.
*G06F 15/167* (2006.01)
*G06F 15/173* (2006.01)

(52) U.S. Cl.
USPC .......... 709/244; 709/212; 709/213; 709/215; 709/238; 709/239

(58) Field of Classification Search
USPC .......................... 709/244, 212, 213, 215, 238
See application file for complete search history.

(56) References Cited

U.S. PATENT DOCUMENTS

| | | | | | |
|---|---|---|---|---|---|
| 5,912,889 | A | * | 6/1999 | Preas et al. | 370/359 |
| 6,061,779 | A | * | 5/2000 | Garde | 712/204 |
| 6,137,807 | A | * | 10/2000 | Rusu et al. | 370/429 |
| 6,449,283 | B1 | * | 9/2002 | Chao et al. | 370/461 |
| 6,490,630 | B1 | * | 12/2002 | Poon et al. | 709/235 |
| 7,334,086 | B2 | | 2/2008 | Hass et al. | |
| 7,391,786 | B1 | * | 6/2008 | Prasad et al. | 370/412 |
| 7,961,723 | B2 | | 6/2011 | Hass | |
| 2004/0081184 | A1 | | 4/2004 | Magill et al. | |
| 2004/0111540 | A1 | * | 6/2004 | Narad | 710/52 |
| 2005/0036502 | A1 | * | 2/2005 | Blanc et al. | 370/412 |
| 2005/0132148 | A1 | * | 6/2005 | Arimilli et al. | 711/154 |
| 2007/0121499 | A1 | * | 5/2007 | Pal et al. | 370/230 |
| 2008/0016254 | A1 | * | 1/2008 | Kruger et al. | 709/251 |
| 2008/0144361 | A1 | * | 6/2008 | Wong | 365/154 |
| 2008/0184008 | A1 | | 7/2008 | Zhu et al. | |
| 2009/0201935 | A1 | | 8/2009 | Hass et al. | |

FOREIGN PATENT DOCUMENTS

WO    WO 2010/062916    6/2010

OTHER PUBLICATIONS

International Search Report and Written Opinion for PCT Application No. PCT/US09/065802 mailed on May 3, 2010.
International Preliminary Report on Patentability, mailed Jun. 8, 2011, for PCT Appl. No. PCT/US2009/065802, 7 pages.

* cited by examiner

*Primary Examiner* — Rupal Dharia
*Assistant Examiner* — Mohammed Ahmed
(74) *Attorney, Agent, or Firm* — Sterne, Kessler, Goldstein & Fox P.L.L.C.

(57) ABSTRACT

A network-on-chip system, method, and computer program product are provided for transmitting messages utilizing a centralized on-chip shared memory switch. In operation, a message is sent from one of a plurality of agents connected on a messaging network. The message is received at a central shared memory switch, the central shared memory switch being in communication with each of the plurality of agents. Further, the message is transmitted from the central shared memory switch to a destination agent, the destination agent being one of the plurality of agents.

22 Claims, 5 Drawing Sheets

NETWORK-ON-CHIP SYSTEM, METHOD, AND COMPUTER PROGRAM PRODUCT FOR TRANSMITTING MESSAGES UTILIZING A CENTRALIZED ON-CHIP SHARED MEMORY SWITCH

FIELD OF THE INVENTION

The present invention relates to Network-on-Chip (NoC) systems, and more particularly to transmitting messages efficiently utilizing such systems.

BACKGROUND

With of the advent of System-on-Chips (SoC) and Chip-Multiprocessing (CMP), Network-on-Chips (NoC) are becoming more utilized. One design challenge in any NoC is providing adequate destination buffer space for good performance across a wide range of applications with reasonable area overhead and area inefficiency.

Conventional NoC architectures range from ring to mesh topologies. In these topologies, all the destination queues may be physically located at the destination agent. In a mesh topology, each cross-point also contains a small crossbar switch. In addition, buffers need to be provided at each intermediate stop or cross-point.

Implementing a large number of distinct queues leads to a large area overhead and large degree of area inefficiency. Also, since the destination queues are physically located at the destination agent, it is not possible to reconfigure the queues according to the application requirement. In order to provide adequate performance for a wide range of applications, all the queues have to be sized to the maximum required size even though not all queues need to be maximum sized for any one application. The intermediate buffers and cross-bar switch at each stop or cross-point also consume significant area. There is thus a need for addressing these and/or other issues associated with the prior art.

SUMMARY

A network-on-chip system, method, and computer program product are provided for transmitting messages utilizing a centralized on-chip shared memory switch. In operation, a message is sent from one of a plurality of agents connected on a messaging network. The message is received at a central shared memory switch, the central shared memory switch being in communication with each of the plurality of agents. Further, the message is transmitted from the central shared memory switch to a destination agent, the destination agent being one of the plurality of agents.

DETAILED DESCRIPTION

Figure 1:
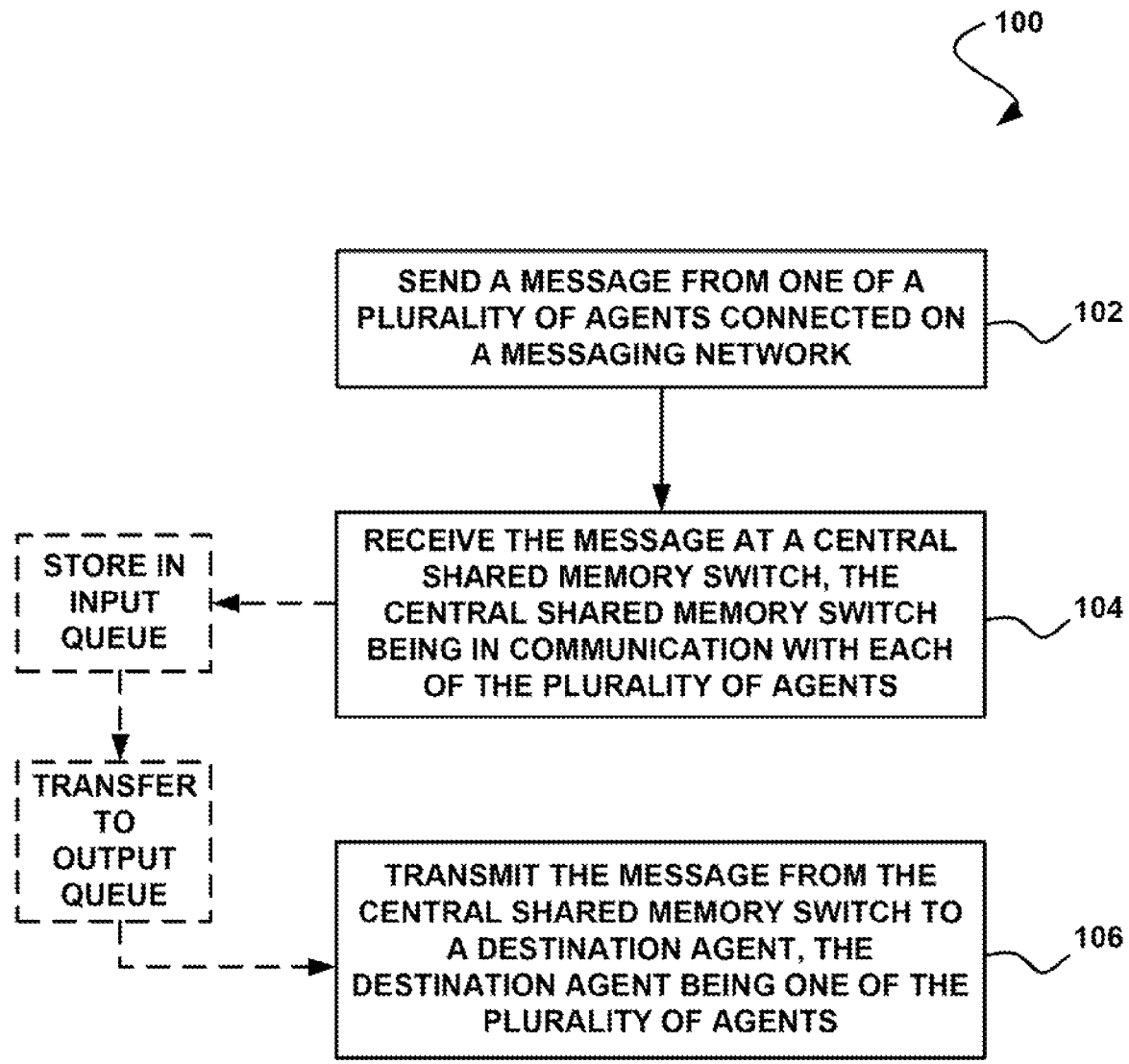
FIG. 1 shows a method for transmitting messages utilizing a centralized on-chip shared memory switch, in accordance with one embodiment.

FIG. 1 shows a method 100 for transmitting messages utilizing a centralized on-chip shared memory switch, in accordance with one embodiment. As shown, a message is sent from one of a plurality of agents connected on a messaging network. See operation 102.

The message is received at a central shared memory switch, the central shared memory switch being in communication with each of the plurality of agents. See operation 104. In the context of the present description, a central shared memory switch refers to any component that includes memory and is capable of receiving a message from a sender agent such that the message may be transmitted to a receiver agent.

In one embodiment, the central shared memory switch may include an input queue and/or an output queue. In this case, the input queue of the central shared memory switch may be configured to and be capable of receiving messages sent by the sender agent. Additionally, the output queue of the central shared memory switch may be configured to and be capable of storing messages sent by the sender agent that are to be output to a receiver agent.

In these cases, at least a portion of the memory of the central shared memory switch may be allocated as an input queue and/or an output queue for each of the plurality of agents. In one embodiment, the portion of the memory allocated may be software programmable. For example, memory allocated to each of multiple output queues may be software programmable.

In another embodiment, at least a portion of the memory may be divided into a plurality of banks. In this way, a plurality of concurrent operations may be performed using the plurality of banks.

It should be noted that the agents may include any component capable of interfacing with the messaging network. For example, in various embodiments, the agents may include central processing units, PCI components, Ethernet components, and any other component capable of sending and/or receiving messages.

It should also be noted that the central shared memory switch may be located at any physical location on the chip and is not limited to a physical center point. In this context, central refers to the shared memory switch being shared among the agents for routing messages.

Once the message is received by the central shared memory switch, the message is transmitted from the central shared memory switch to a destination agent, the destination agent being one of the plurality of agents. See operation 106. In one embodiment, between being received by the source and being transmitted to the destination agent, the message may be stored in an input queue, switched to an output queue, and stored in the output queue.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
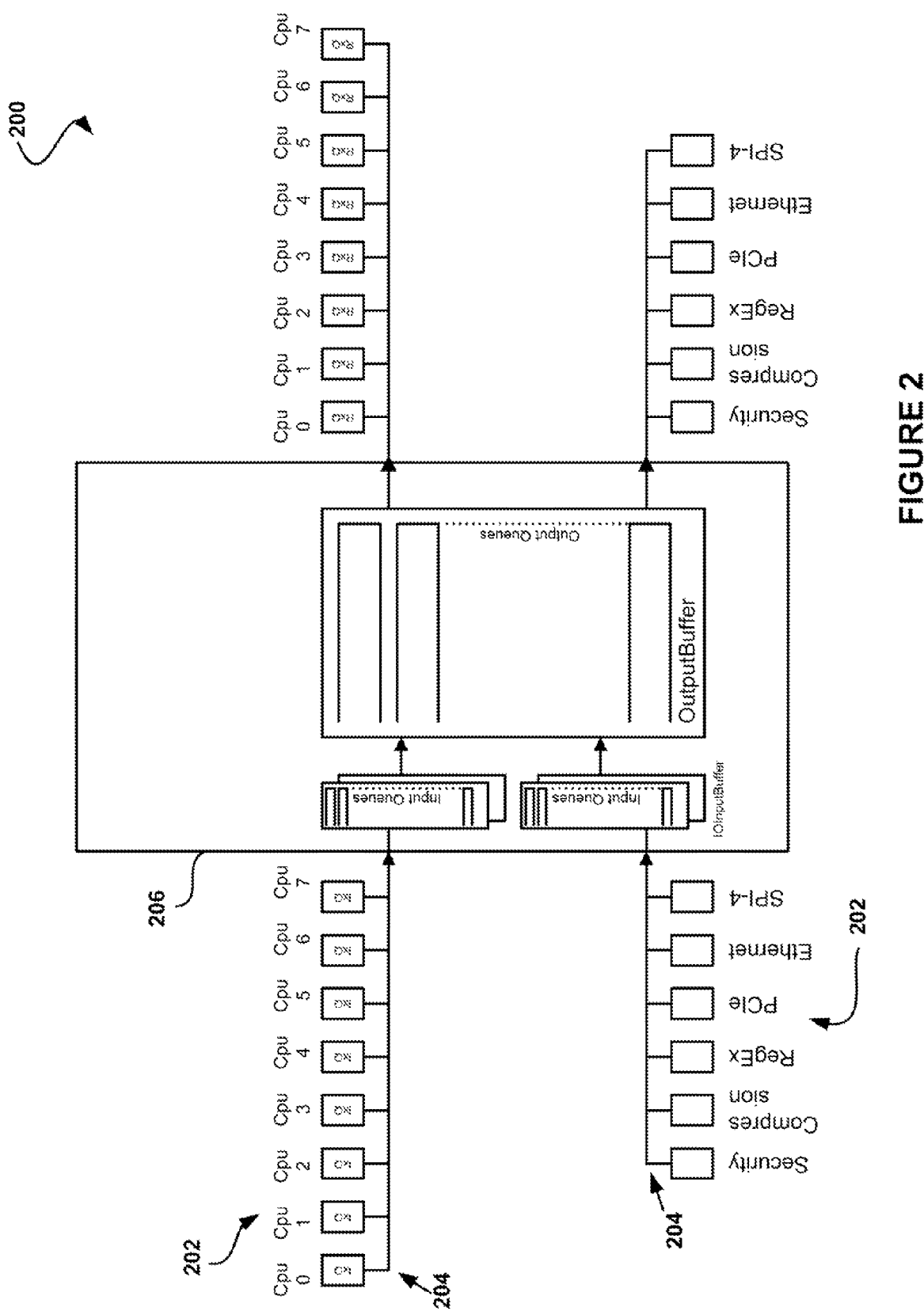
FIG. 2 shows a system for transmitting messages utilizing a centralized on-chip shared memory switch, in accordance with one embodiment.

FIG. 2 shows a system 200 for transmitting messages utilizing a centralized on-chip shared memory switch, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 includes a plurality of agents 202. Furthermore, the system includes at least one message chain 204, the at least one message chain 204 being coupled to the plurality of agents 202. Additionally, the system 200 includes a central shared memory switch 206 coupled to the at least one message chain 204. In this case, the central shared memory switch 206 includes memory and is configured to route messages from a sender agent to a receiver agent.

In one embodiment, the system 200 may represent a Network-on-Chip (NoC) architecture that uses the centralized on-chip shared memory switch 206 to allow for network configuration and queue allocation according to application requirements. In this way, a large centralized buffer pool may be implemented efficiently and the available buffer space may be divided among destination queues associated with the plurality of agents 202, based on application requirements.

The Network-on-Chip system 200 may be capable of delivering messages between any of the agents 202. In this case, the fast message network refers to a hierarchical packet switching network. All agents (e.g. CPUs, networking interfaces, PCIe, security, compression and RegEx engines, etc.) within each node may be connected to the network. Messages may be exchanged between any agent connected to the network.

In one embodiment, various sizes of messages may be sent between the agents 202. The message may include a variety of information. For example, in various embodiments, the message may include payload data along with a header including software code, a source ID, a destination ID, a size, and various other information.

In one embodiment, each of the agents 202 may include a transmit queue (TxQ) and outgoing messages may be stored in the transmit queue. All the agents 202 (e.g. any units which source or sink messages, etc.) may be connected to a message chain 204. In one embodiment, a CPU may be connected to a CPU input and output chain, and IO units may be connected to an IO input and output chain.

In one embodiment, after being switched from its input queue (IQ) to its output queue (OQ), the messages may be stored in the respective output queues from where they are transmitted over the output chain to a corresponding receive queue (RxQ) at the destination agent.

In one embodiment, each destination agent may include multiple virtual channels (VCs) in which it can receive messages. These virtual channels may be utilized to prevent messages in one virtual channel from blocking messages in another virtual channel and to allow a different level of priority on different virtual channels. An agent may use each of its virtual channels to receive either messages pushed by other agents. Each virtual channel may have its own output queue/receive queue pair. Additionally, each output queue/receive queue pair may function as a virtual channel.

In one embodiment, the output queues may be paired to destination agents and may automatically deliver the messages to the destination agent in the corresponding virtual channel. Any agent may send a message to any destination agent by sending a push request to one of the push output queues paired to the destination agent.

In one embodiment, the output queues may be maintained in a central SRAM. The output queues which overflow their allocated space in the central SRAM may be spilled into the main memory via a spill/fill mechanism. The allocated space for each output queue in the central SRAM and main memory may be software programmable.

Additionally, the central SRAM may be multi-banked for multiple concurrent operations to different banks. This may be implemented to maximize a throughput through the central shared memory switch 206.

In one embodiment, the input queues may be serviced in a round robin fashion for switching the messages to their respective output queues in the central SRAM. In one embodiment, the output queues may also be serviced in a round robin fashion for access to the output chain.

In one embodiment, the system 200 may implement a credit based end-to-end flow control. In this case, each source agent may store credits for each of the possible destinations and may send a message only if it has enough credits. This may be implemented to prevent head-of-line (HOL) blocking in the network.

In one embodiment, these credits may be software configurable. Furthermore, there may be credit based flow control between each source agent and its respective input queue in the centralized on-chip shared memory switch 206. Each virtual channel may also utilize credit based flow control between the output queues and the receive queues.

The message chain 204 may include any channel capable of carrying the message from each of the agents to the centralized shared memory switch 206. As noted above, there may be separate message chains for CPUs and IOs.

Further, there may be an output message chain that carries messages from the centralized shared memory switch 206 to each of the agents 202. In addition to the message chains, there may be credit rings each for CPUs and IOs. Input queue credit rings may carry input queue credits from the centralized shared memory switch 206 to each of the agents. A receive queue credit chain may carry RxQ credits from each of agents to the central message station. An output queue credit ring may carry output queue credits from the centralized shared memory switch 206 to each of the agents 202. In one embodiment, each agent 202 may include a message station, including a multiplexer (mux), for receiving messages. Each message station may mux the incoming packet with its own packet and may flop it before transmitting it to the next station.

In one embodiment, each of the message stations of the agents 202 may not be able to sink incoming input queue and output queue credits fast enough. For example, they may be running at a different clock frequency than the message chain. In some cases, if the agent message station is running at slower frequency than the message chain, an inbound buffer (e.g. a message queue, a push queue, a pop queue, and an output credit queue, etc.) may overflow because they might not be transferred to the slower clock domain fast enough. Thus, as an option, message stations of the agents may recirculate the input queue and output queue credit packets on the respective rings if the incoming buffer is full.

Figure 3:
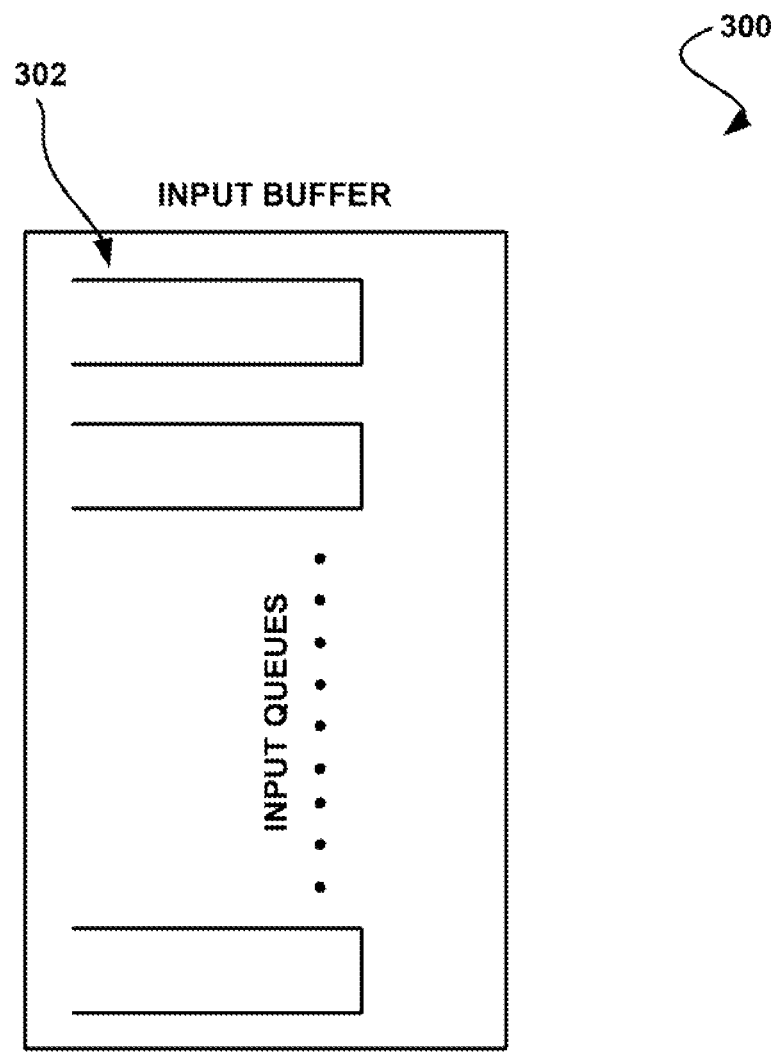
FIG. 3 shows an input buffer for a central shared memory switch, in accordance with one embodiment.

FIG. 3 shows an input buffer 300 for a central shared memory switch, in accordance with one embodiment. As an option, the input buffer 300 may be implemented in the context of the functionality and architecture of FIGS. 1-2. Of course, however, the input buffer 300 may be implemented in any desired environment. Again, the aforementioned definitions may apply during the present description.

In operation, messages may be enqueued in input queues 302 maintained for each source agent. In one embodiment, there may be one input queue for each agent. With this input queue configuration, push requests from different agents may not block each.

In one embodiment, a credit based flow control may be utilized between the transmit queue for each message station associated with an agent and its corresponding input queue in the central shared memory switch. The credits may be returned on a credit chain which flows in the same direction as the messages. This may be implemented to have the same message send to credit return latency for all sources.

Figure 4:
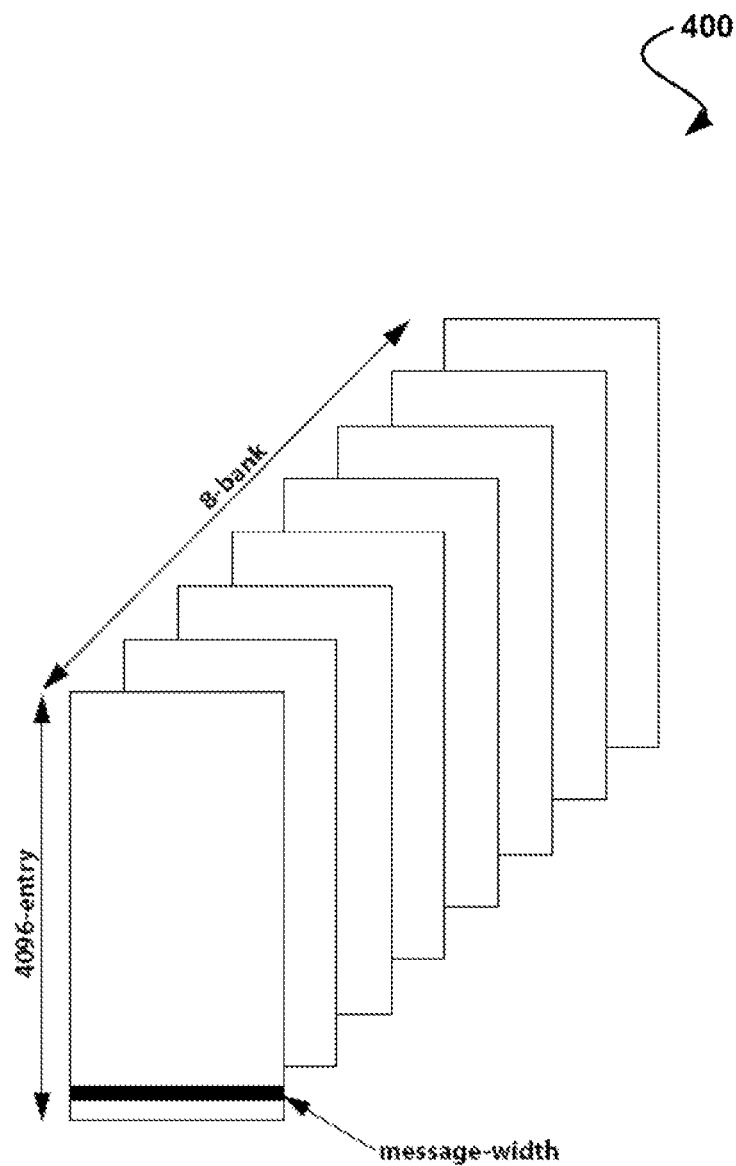
FIG. 4 shows an output buffer for a central shared memory switch, in accordance with one embodiment.

FIG. 4 shows an output buffer 400 for a central shared memory switch, in accordance with one embodiment. As an option, the output buffer 400 may be implemented in the context of the functionality and architecture of FIGS. 1-3. Of course, however, the output buffer 400 may be implemented in any desired environment. Further, the aforementioned definitions may apply during the present description.

In operation, messages from an input queue may be switched to their respective output queue after arbitrating with other requests for the memory in which output queues are maintained. After being switched to their output queues, the messages may stay in their own virtual channel until reaching their final destination.

The output queues are maintained in the output buffer 400, which, in one embodiment, may be an SRAM structure. In one embodiment, the memory used for the output buffer may be divided into a plurality on banks. For example, the memory may be a structure including eight banks of 4096 entry× message width SRAMs. In this case, the SRAM macro may be designed to run at 1 GHz with a 1 cycle read/write access. A read/write transaction may be initiated for each bank every cycle for a total of eight accesses per cycle.

As an option, successive entries of the same output queue may be placed in successive banks. This may be implemented to spread different read and write accesses to the same/different output queue over as many different banks as possible so that they can be scheduled concurrently. Spreading the accesses to as many banks as possible to maximize the concurrency may be implemented to achieve the desired peak throughput.

In one embodiment, output queues may be allocated from the output buffer 400 by software and software may allocate different amount of space to each output queue. As an example, the total capacity of the output buffer 400 may be a 32K entry. Each output queue may be sized from 32 entry to 1024 entry in increments of 32 entries. This may be accomplished by specifying a start and an end pointer (e.g. pointers to the first and last 32 entry chunks allocated to the output queue). Of course, this is an example implementation of the output buffer 400, and should not be construed as limiting in any manner.

In one embodiment, all of the input queues may be serviced in round robin (RR) fashion. In this case, each cycle, one each of CPU input queues, IO input queues, that are not blocked may be chosen to participate in a next round of arbitration for access to the output queues. As an option, multiple may be allocated for initial request to final grant operation. In one embodiment, the request-grant operations may be pipe-lined so that a new operation may be initiated every cycle. To avoid bypassing the result of the first operation to the second operation, independent round-robin pointers may be maintained and used in successive cycles.

In one embodiment, the output queues may also be serviced in round-robin fashion. Each cycle the round-robin arbiter may pick one message, each which may be eligible for transmission to a CPU and IO output chain. In one embodiment, these requests may arbitrate for access to the output queues with multiple cycle latency in a pipelined fashion similar to that described for input queues.

In one embodiment, the messages chosen may lookup the appropriate pointer of their output queue to get the bank ID. The next and final step of arbitration may be among all the requests to any bank. As mentioned earlier, in one embodiment, the output buffer may be an 8 banked SRAM with 1 cycle read/write latency at 1 GHz. All banks may be accessed independently each cycle. In this case, in any cycle, there may be multiple to access the SRAM.

In this example, these requests may be spread over the eight banks. A bank may be matched to one request at a time and may be busy for one cycle. Spreading the requests to as many banks as possible and accessing as many banks as possible each cycle may be implemented to achieve the desired throughput.

In one embodiment, successive entries of the output queue may be located in successive queues in order to spread the accesses over as many banks as possible and increase the available concurrency.

Figure 5:
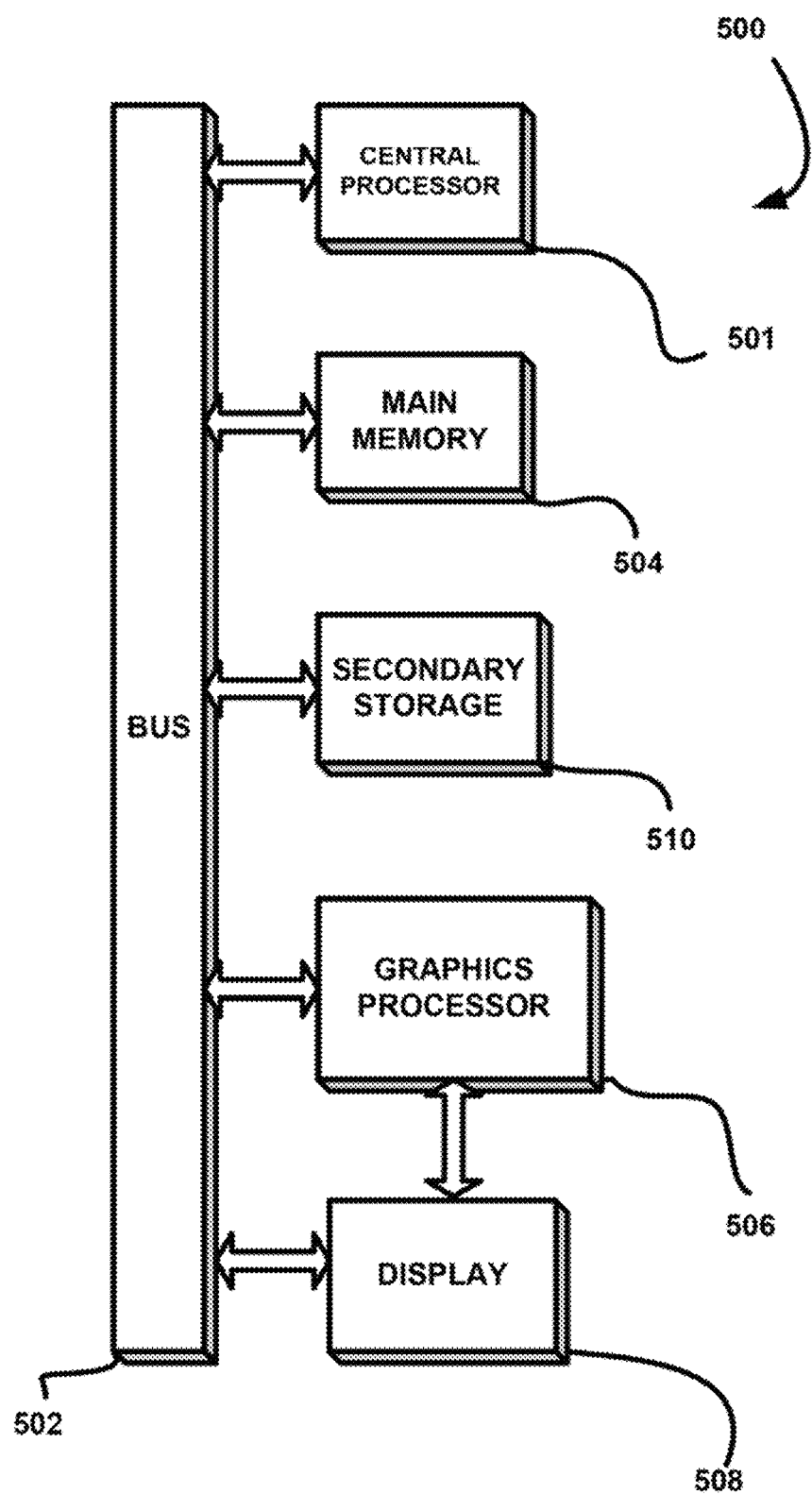
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices including, but not limited to, a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system comprising:
   a plurality of agents;
   at least one message chain, the at least one message chain being coupled to the plurality of agents;
   an input queue credit ring and an output queue credit ring; and
   a central shared memory switch coupled to the at least one message chain, the central shared memory switch being configured to route messages from a sender agent to a receiver agent, and the central shared memory switch including input queues, output queues, and memory comprising a plurality of banks,
   wherein the input queue credit ring is configured to transport input credits from the input queues to the plurality of agents, the output queue credit ring is configured to transport output credits from the output queues to the plurality of agents, and the input queue credit ring and the output queue credit ring are configured to recirculate the respective input credits and output credits based on an availability of the plurality of agents to accept the input credits and the output credits from the input queue credit ring and the output queue credit ring, respectively, and
   wherein the output queues are respectively associated with the plurality of agents, queue entries in the output queues are located in successive banks in the plurality of banks, and the output queues are configured so that at least two banks of the plurality of banks are accessible concurrently.

2. The system of claim 1, wherein the input queues are configured to receive messages sent by the sender agent.

3. The system of claim 1, wherein the output queues are configured to store messages sent by the sender agent that are to be output to the receiver agent.

4. The system of claim 1, wherein at least a portion of the memory is allocated as the input queues for each of the plurality of agents.

5. The system of claim 1, wherein at least a portion of the memory is allocated as the output queues for each of the plurality of agents and the portion of the memory is software programmable.

6. The system of claim 1, wherein a plurality of concurrent operations are performed using the plurality of banks.

7. The system of claim 1, wherein the memory includes a static random access memory (SRAM).

8. A method comprising:
   sending a message from one of a plurality of agents connected on a messaging network;
   receiving the message at a central shared memory switch, the central shared memory switch being in communication with each of the plurality of agents;
   transmitting the message from the central shared memory switch to a destination agent, the destination agent being one of the plurality of agents, wherein the central shared memory switch includes input queues, output queues, and memory comprising a plurality of banks;
   transporting, using an input queue credit ring, input credits from the input queues to the plurality of agents, wherein the transporting of input credits includes recirculating the input credits to the plurality of agents based on an availability of the plurality of agents to accept the input credits from the input queue credit ring;
   transporting, using an output queue credit ring, output credits from the output queues to the plurality of agents, wherein the transporting of the output credits includes recirculating the output credits to the plurality of agents based on an availability of the plurality of agents to accept the output credits from the output queue credit ring; and
   allocating a portion of the memory as output queues respectively associated with the plurality of agents, wherein queue entries in the output queues are located in successive banks in the plurality of banks, and the output queues are configured so that at least two banks of the plurality of banks are accessible concurrently.

9. The method of claim 8, wherein at least a portion of the memory of the central shared memory switch is allocated as the input queues for each of the plurality of agents.

10. The method of claim 8, wherein at least a portion of the memory is allocated as the output queues for each of the plurality of agents and the portion of the memory is software programmable.

11. The method of claim 8, wherein a plurality of concurrent operations are performed using the plurality of banks.

12. A computer program product embodied on a non-transitory computer readable medium, comprising:
    computer code configured to send a message from one of a plurality of agents connected on a messaging network;
    computer code configured to receive the message at a central shared memory switch, the central shared memory switch being in communication with each of the plurality of agents; and
    computer code configured to transmit the message from the central shared memory switch to a destination agent, the destination agent being one of the plurality of agents, wherein the central shared memory switch includes input queues, output queues, and memory comprising a plurality of banks;
    computer code configured to transport, using an input queue credit ring, input credits from the input queues to the plurality of agents, wherein the transporting of input credits includes recirculating the input credits to the plurality of agents based on an availability of the plurality of agents to accept the input credits from the input queue credit ring; and
    computer code configured to transport, using an output queue credit ring, output credits from the output queues to the plurality of agents, wherein the transporting of the output credits includes recirculating the output credits to the plurality of agents based on an availability of the plurality of agents to accept the output credits from the output queue credit ring,
    wherein the output queues are respectively associated with the plurality of agents, queue entries in the output queues are located in successive banks in the plurality of banks, and the output queues are configured so that at least two banks of the plurality of banks are accessible concurrently.

13. The computer program product embodied on a computer readable medium of claim 12, wherein the input queues are configured to receive messages sent by the sender agent.

14. The computer program product embodied on a computer readable medium of claim 12, wherein the output queues are configured to store messages sent by the sender agent that are to be output to the receiver agent.

15. The computer program product embodied on a computer readable medium of claim 12, wherein at least a portion of the memory of the central shared memory switch is allocated as the input queues for each of the plurality of agents.

16. The computer program product embodied on a computer readable medium of claim 12, wherein at least a portion of the memory is allocated as the output queues for each of the plurality of agents and the portion of the memory is software programmable.

17. The computer program product embodied on a computer readable medium of claim 12, wherein a plurality of concurrent operations are performed using the plurality of banks.

18. The computer program product embodied on a computer readable medium of claim 12, wherein the memory of the central shared memory switch includes a static random access memory (SRAM).

19. The system of claim 1, wherein the routing of messages by the central shared memory switch is based on the input credits and the output credits.

20. The system of claim 1, wherein the recirculation of the input credits and output credits is based on an operational frequency of the at least one message chain and operational frequencies of the plurality of agents.

21. The system of claim 1, wherein the input credits and output credits are transported to the plurality of agents based on respective locations of the plurality of agents on the at least one message chain.

22. The system of claim 21, wherein the input credits and output credits are transported to the plurality of agents in an order being from an agent of the plurality of agents located farthest from the central shared memory switch on the at least one message chain to an agent of the plurality of agents located closest to the central shared memory switch on the at least one message chain.

* * * * *